United States Patent [19]

Varden

[11] Patent Number: 5,417,404
[45] Date of Patent: May 23, 1995

[54] GEARED BALL VALVE

[76] Inventor: Arnold Varden, 8 Ottaway Ave., Barrie Ont, Canada, L4M 2W7

[21] Appl. No.: 140,386
[22] Filed: Oct. 22, 1993
[51] Int. Cl.⁶ ............................................. F16K 5/20
[52] U.S. Cl. .................................. 251/161; 251/188
[58] Field of Search .............. 251/160, 161, 164, 165, 251/188

[56] References Cited

U.S. PATENT DOCUMENTS

| | | | |
|---|---|---|---|
| 2,577,725 | 12/1951 | Drake . | |
| 4,273,152 | 6/1981 | Freeman | 137/559 X |
| 4,634,098 | 1/1987 | Varden | 137/559 X |
| 5,137,258 | 8/1992 | Takamatsu | 251/188 X |

FOREIGN PATENT DOCUMENTS

| | | | |
|---|---|---|---|
| 0107868 | of 0000 | European Pat. Off. . | |
| 2383369 | of 0000 | France . | |
| 1122788 | of 0000 | Germany . | |
| 602611 | 8/1934 | Germany | 251/188 |
| 475154 | 11/1937 | United Kingdom | 251/160 |
| 1218327 | 1/1971 | United Kingdom | 251/160 |

Primary Examiner—John C. Fox
Attorney, Agent, or Firm—Bereskin & Parr

[57] ABSTRACT

This invention relates to ball valves. One problem with conventional ball valves is that opening and closing the valve causes the valve seal to scrape across the valve seat. This reduces the life of the seal. This scraping problem can be eliminated by retracting the seal from the seat before turning the valve.

In this invention, the ball valve has two coaxial handle assemblies. The outer, lever, assembly turns the valve closure member within its housing. The inner, hand-wheel, assembly is used independently to retract or extend the valve seal from or to the valve seat. The retraction or extension is achieved by use of a jack-screw shaft which pushes the seal in and out. The jack screw shaft is driven by a series of gears—a first bevel gear, a ring gear, and a second bevel gear—driven by the inner handle assembly. The ball valve is also provided with an inspection port. This port permits inspection, repair, or replacement of the valve seal while the valve is in use in its open position.

11 Claims, 5 Drawing Sheets

GEARED BALL VALVE

FIELD OF THE INVENTION

This invention relates generally to valves and their construction, and in particular to the ball valve type wherein a ball pivots within a housing to open or close a flow path and in which the ball carries a seal which mates with a stationary valve seat.

BACKGROUND OF THE INVENTION

The present invention relates to the construction of a ball or globe valve, particularly for use in shutting off pipelines and the like. Ball valves are known generally. They have several advantages. Among those advantages are their relative economy of manufacture and relatively little requirement for maintenance. When ball valves are used in high pressure lines, such as gas and oil transmission lines, one of their disadvantages becomes apparent. In order to maintain an effective seal such high pressure lines require a significant force between the ball seal and the valve seat. Opening or closing a standard ball valve by rotating it with respect to its housing promotes failure of the seal, whether the seal is carried by the ball or by the seat. The rubbing motion of the ball with respect to the seat tends to cause the seal to tear. When the seal fails the pipeline must be shut down and the valve entirely disassembled to permit replacement of the seal and the seat.

Various attempts have been made to provide closure members of the ball valve type in which the closure member moves in a direction axial to the seat to retract the seal before any angular movement. The inventor's existing U.S. Pat. No. 4,634,098 is one such example as are U.S. Pat. No. 2,577,725; German 1,122,788; France 2,383,369 and European patent A-107 868.

U.S. '725 and German '788 teach ball valves eccentrically mounted in a yoke which pivots. In these arrangements, however, the initial axial movement is accompanied by a rotational movement. French '369 and European '868 disclose ball valves having operating means whereby the closure member may be sequentially rotated and translated. However, those valves still require that the pipeline be shut down and the valve be completely disassembled in order to repair or inspect the seat.

The inventor's previous invention solved this problem first, by providing an inspection port in the housing for inspection, repair, or replacement, of the seal and second, by means of a concentric shaft system in which one shaft served to rotate the ball valve and the other shaft worked through means of a sliding block and an eccentric to cause translation of the seal in and out of the seat independent of angular motion. This previous embodiment required a pair of driven concentric shafts on one side of the ball valve, the top, and a second pair of slave concentric stub shafts diametrically opposite, on the bottom, joined by a slave arm. This slave arm assembly and its co-operation with the two eccentric shaft and slider assemblies yielded a structure which was relatively complicated and expensive to manufacture. Furthermore, retraction of the seal with respect to the valve seat was limited to twice the eccentric as achieved by rotation of one of the co-axial shafts 180° with respect to the other co-axial shaft. This in turn limited the closure pressure that could be achieved to that which could be transmitted through the handle in one-half turn.

BRIEF SUMMARY

The present invention relates to an improved ball valve apparatus to provide several advantages over the prior structure. It is an object of the present invention to provide an improved structure, first by providing a jack shaft and bevel gear assembly to translate the seal toward and away from the seat for the seal. This invention also provides a mechanism whereby translation of the seal with respect to the seat is only limited by the length of the jack shaft available. This invention further provides a mechanism whereby, upon choice of a fine enough jack shaft thread, or suitable reduction gear ratio, any desired closure pressure may be achieved at the interface of the seal and the seat.

According to the present invention there is provided a valve for use in a pipeline comprising a housing, having an inlet, and outlet, and an internal chamber to accommodate a closure, a closure member contained within that housing and that closure member carrying a movable sealing portion with the closure member being movable from a closed position blocking fluid flow through the valve to an open position permitting fluid flow through the valve, including operating means to move the closure member, including a main means to move the closure member angularly about an axis and auxiliary means movable relative to the main operating means, to move the sealing portion radially with respect to that axis, the closure member and the housing having co-operative sealing means for sealing the inlet, and the means to move the closure member angularly comprising a main stem affixed to the closure member and a pivot, the closure member mounted on the pivot, and the means to move the sealing portion of the closure member radially with respect to the axis comprising an auxiliary stem concentric with the main stem, the sealing portion having a guide means and a jacking means such that the guide means and the jacking means are adapted to guide and translate the sealing portion radially relative to the axis and connecting means operatively connecting the auxiliary stem to the jacking means so that rotation of the auxiliary stem causes translational movement of the sealing portion.

A better understanding of the present invention and its features and advantages may be gained from review of the following description of a preferred embodiment of the invention taken in connection with the following drawings and in which.

DETAILED DESCRIPTION

Figure 1:
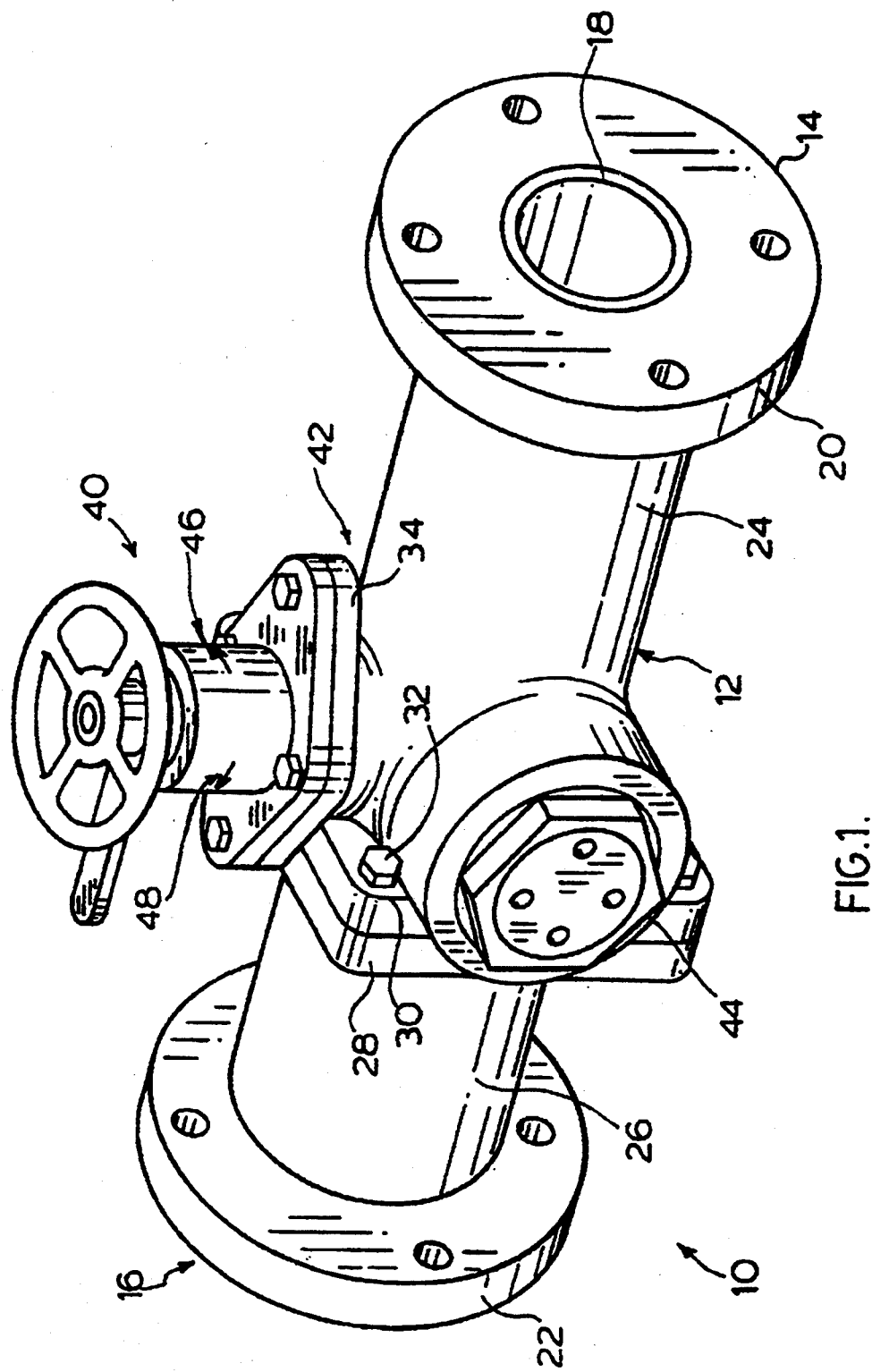
FIG. 1 is a general view of a ball valve assembly in accordance with a preferred embodiment of the invention.

FIG. 1 is a general illustration of a ball valve assembly 10 comprising a geared ball valve housing 12, an inlet, shown generally as 14, an outlet, shown generally as 16, a bore 18, an inlet flange 20, an outlet flange 22, an inlet half shell 24, an outlet half shell 26, an outlet half shell parting flange 28 and an inlet half shell parting flange 30, fastening means 32, a valve housing pedestal 34, a co-axial stem assembly shown generally as 40, a stem housing 42 and an inspection port shown generally as 44.

The valve is mounted in a pipeline (not shown) by means of the inlet flange 20 and the outlet flange 22, with the inlet flange oriented toward the source of pressure. The bore 18 corresponds to the bore of the pipeline. The stem housing 42 comprises a valve open position indicating means 46 and a valve closed position indicating means 48. These position indicating means 46 and 48 may be embossed or impressed witness marks, painted marks, detents, stops, or other commonly used means known to those skilled in the art. The stem housing 42 is mounted on the valve housing pedestal 34 and may be removed to permit removal of the co-axial stem assembly 40 generally. The internal elements of the valve are captured within the two half shells, the inlet half shell 24 and the outlet half shell 26, which mate at their respective flanges 30 and 28 and are held together by the fastening means 32 which may be screws, rivets, weldment, or other means well known to those skilled in the art.

Figure 2:
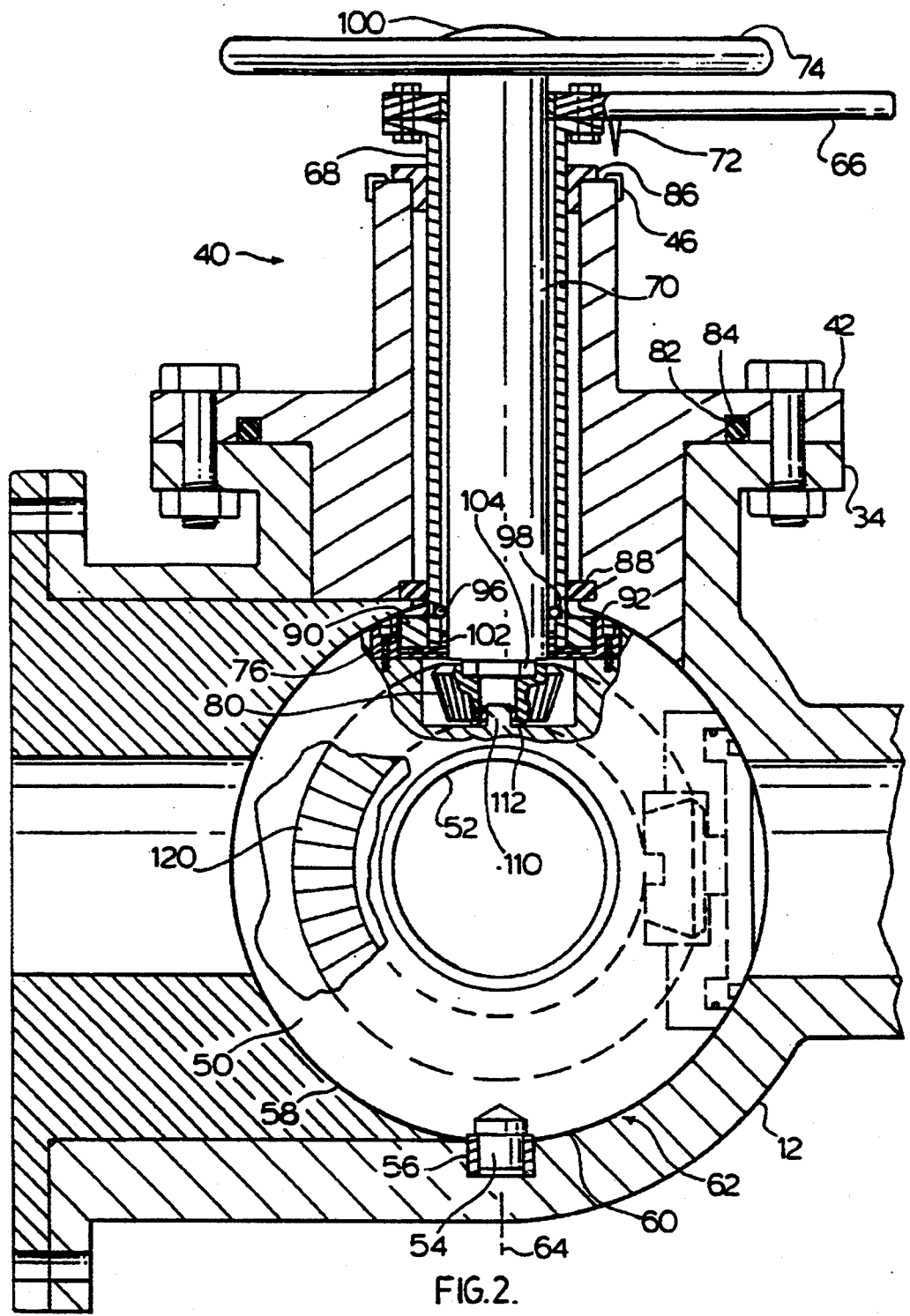
FIG. 2 is a sectional view of the ball valve assembly shown generally in FIG. 1 showing details of the concentric input stems.

FIG. 2 is a cross-section of the valve showing the components of the co-axial stem assembly 40 in greater detail. Once again, the valve housing is shown as 12. It contains a closure member 50 having a cylindrical internal surface 52 defining the fluid passageway through the closure member 50. The closure member 50 has a pivot, or stub shaft 54, which fits in a bearing 56 carried in the valve housing 12. The external part spherical surface 58 of the closure member 50 moves within an internal spherical surface 60 of the housing 12. The internal spherical surface 60 defines a chamber 62 in which the closure member 100 is contained. The axis 64 of the stub shaft 54 is the axis of rotation of the closure member 50. This axis 64 is also the axis of the co-axial stem assembly 40. The stub shaft 54 and bearing 56 provide a pivotal connection between the closure member 50 and the housing 12.

The co-axial stem assembly 40 is comprised of the stem housing 42, a valve opening and closing lever 66, a major stem 68, a minor stem 70, a valve position indicating means 72, a handwheel 74, a first bevel gear capture member 76 and a first bevel gear 80. The stem housing 42 includes an O-ring seal groove 82 and an O-ring seal 84 which contacts the valve housing pedestal 34. The major stem 68 is carried within the stem housing 42 by means of a bushing 86 and an internal stem housing O-ring seal 88. The valve opening and closing lever 66 is fastened to the external end of the major stem 68. The internal end of the major stem 68 has a hexagonal head 90 which acts as a male key for engagement with a female hexagonal socket 92 of the first bevel gear capture member 76.

The valve position indicator means 72 is a mark or detent or other means known to those skilled in the art suitably adapted for co-operation with the valve open position indicating means 44 and the valve stem closed position indicating means 46 of the valve stem housing 42, noted above, such that a person using the embodiment described herein may readily ascertain whether the valve is in its open or closed position, or some intermediate position.

The minor stem 70 is carried within the hollow major stem 68 by means of a bushing 94 and an O-ring seal 96 carried within an O-ring groove 98 internal to the major stem 68. The external end of the minor stem is surmounted by the handwheel 74 having suitable gripping means for turning by hand (not shown). The handwheel 74 is fixed to the minor stem 70 by fastening means 100 such as would be well known to those skilled in the art.

The minor stem 70 is of sufficient length that its inner end extends through a bushing 102 mounted in the first bevel gear capture member 76 such that the inner end of the minor stem 70 engages the first bevel gear 80 by suitable engagement means 104 such as a socket or splines as would be known to those skilled in the art.

The closure member 50 has a first bevel gear locating boss 110 which locates a bushing 112 integral to the first bevel gear 80. To assemble, the first bevel gear capture member 76 is installed on the closure member 50 and the closure member 50 is located within the housing 12.

As can readily be seen, motion of the valve opening and closing lever 66 will rotate the closure member 50 about the pivotal axis 64 of the stub shaft 54 causing the fluid passageway as defined by the cylindrical surface 52 to move to its open position aligned with the bore 18 of the valve generally, or to its closed position in which the internal cylindrical surface 52 is perpendicular to the bore 18 of the valve generally. Thus the opening and closing lever 66 in combination with the major stem 68 and the first bevel gear capture member 76 provide a main means to move the closure member 50 angularly about the axis 64. Similarly, it can be seen that rotation of the handwheel 74 will cause rotation of the first bevel gear 80 independent of the position or motion of the major stem 68.

Figure 3A:
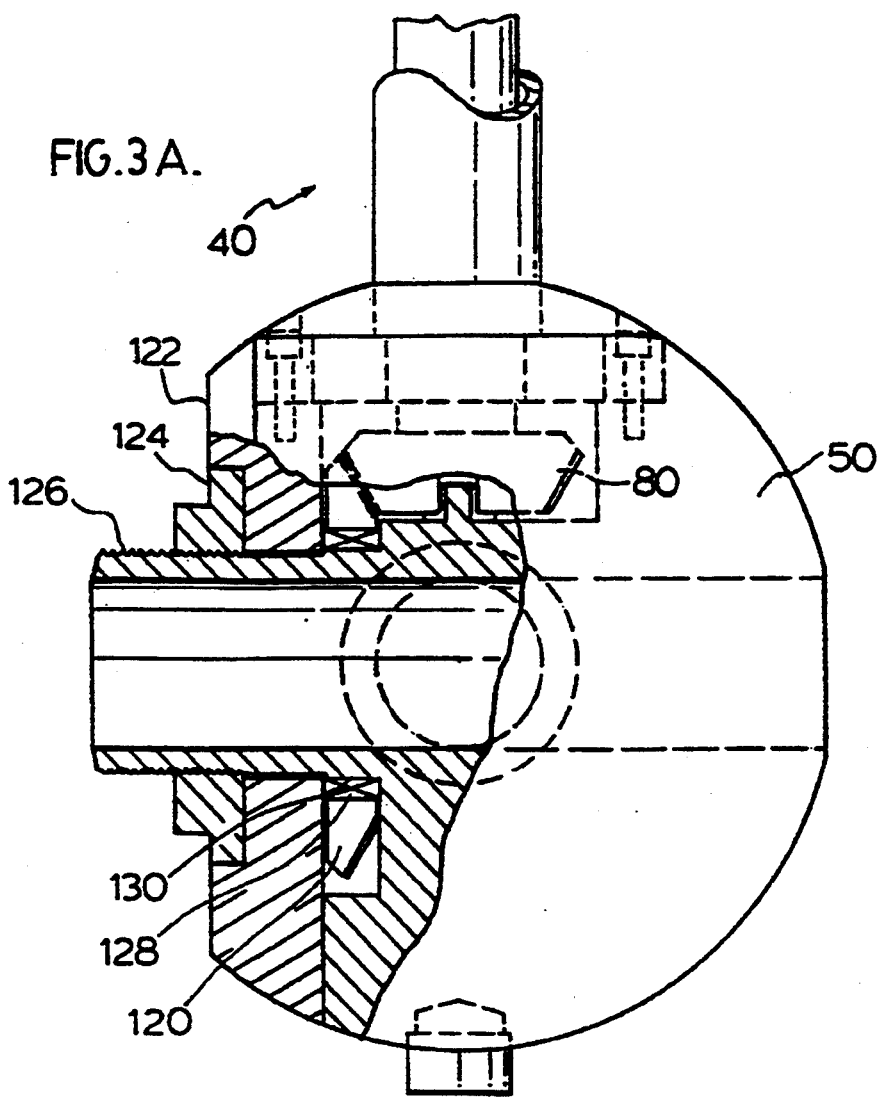
FIG. 3 is a sectional view of the ball valve assembly of FIG. 1 showing a ring gear configuration.
Figure 3B:
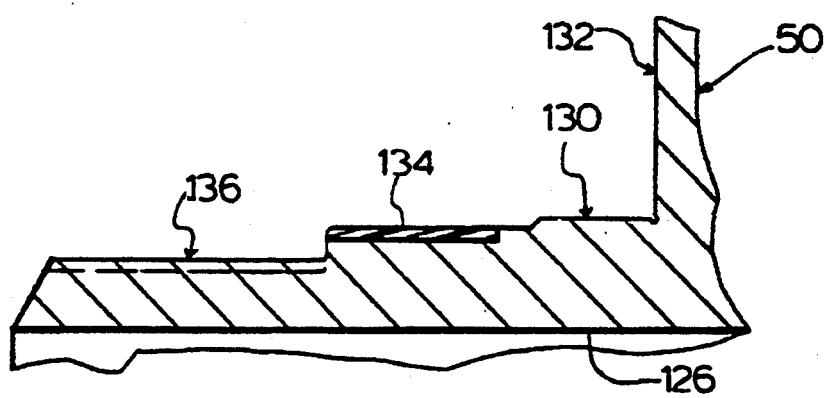

FIG. 3 illustrates the installation of a ring gear 120. The ring gear 120 is a bevel gear suitable for engagement with the first bevel gear 80 noted above. FIG. 3 also shows the closure member 50, the co-axial stem assembly 40, the first bevel gear 80, the ring gear 120, a backing ring 122, a locking ring 124 and a stub cylinder 126.

The ring gear 120 is carried on a bearing 128 of suitable diameter to fit on a bearing seat 130 at the base of the stub cylinder 126, adjacent to the bearing face, or shoulder 132, machined into the closure member 50. The backing ring 122 captures the ring gear 120 and is oriented to mate with the first bevel gear capture member 76. The backing ring 122 is held in place by the locking ring 124 suitably adapted to engage an externally threaded wall portion 134 of an extended cylindrical member 136 of the stub cylinder 126.

Figure 4:
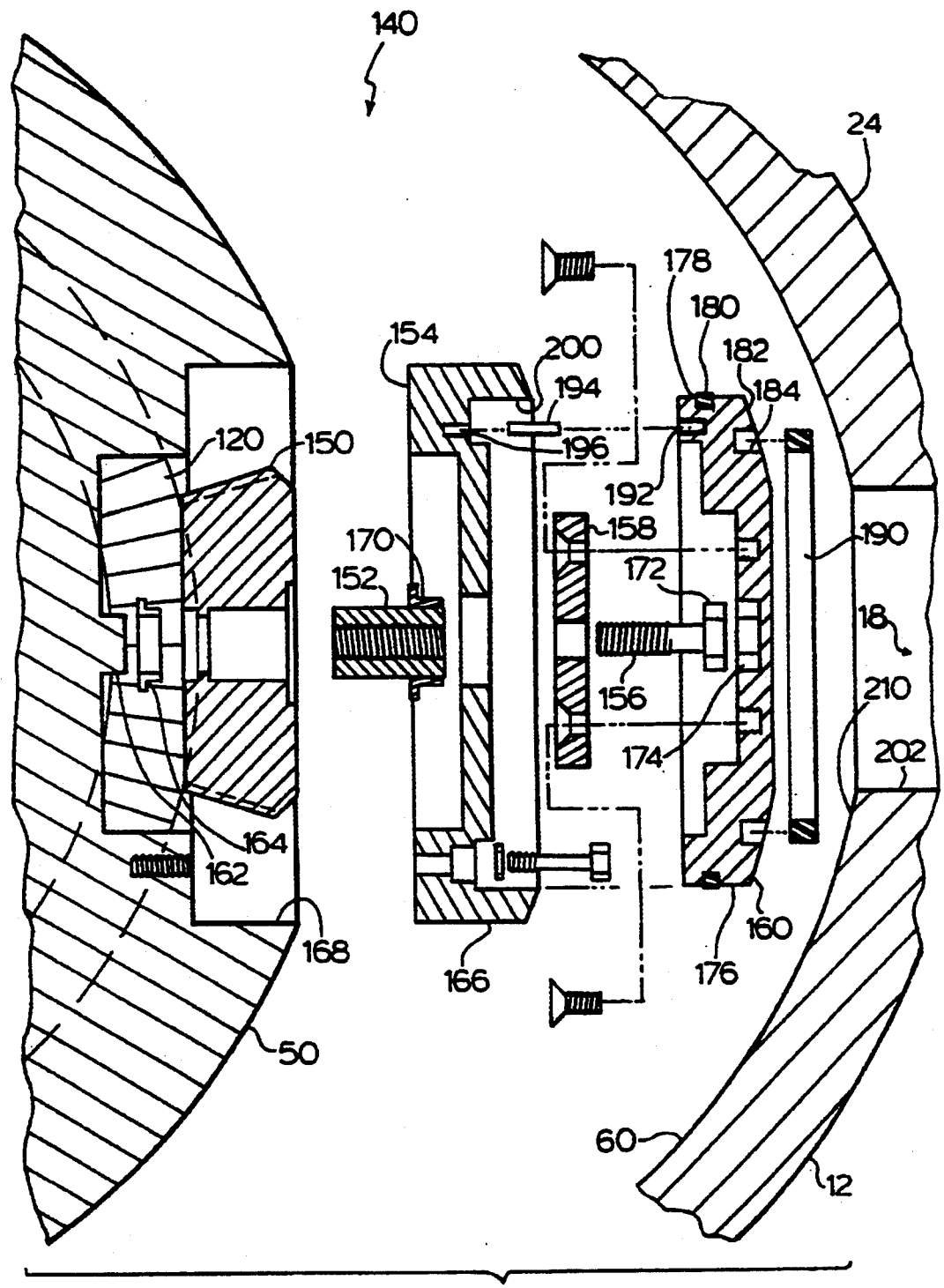
FIG. 4 is a sectional view of the ball valve assembly shown in FIG. 2 showing a detail of the second bevel gear, jack shaft, and seal carrier assembly.

FIG. 4 shows the installation of a second bevel gear assembly shown generally as 140 and comprising the major components shown as a second bevel gear 150, an internally threaded collar 152, a stationary carrier housing 154, a jack screw 156, a jack screw capture plate 158 and a moving seal carrier generally 160.

The closure member 50 has a second bevel gear locating boss 162 which co-operates with a bushing 164 carried in the second bevel gear 150. The stationery carrier housing 154 has an external cylindrical surface 166 which fits within an internal cylindrical surface 168 of the closure member 50. When in position, the stationery carrier housing 154 captures the second bevel gear 150. The internally threaded collar 152 is fixed within the second bevel gear 150 and extends outwardly, that is, radially away from the axis 64, from the second bevel gear 150 through a bushing 170 carried in the stationery carrier housing 154.

The jack screw 156 has a hexagonal head 172 which mates with a female hexagonal socket 174 in the moving seal carrier 160. The jack screw 156 is retained by the jack screw capture plate 158.

The moving seal carrier 160 has an external cylindrical surface 176 with a cylindrical channel 178 adapted to carry a guide face seal 180. The adjacent outer face of the moving seal carrier 160 is a part spherical surface 182 approximating the curvature of the surface of the part spherical surface 58 of the closure member 50. The external part spherical face 182 has an annular channel 184 adapted to accommodate a main seal 90.

A locating clearance hole 192 in the inner face of the moving seal carrier 160 is adapted to co-operate with a locating pin 194 which has been press fit in a blind hole 196 in the outer face of the stationery carrier housing 154. The stationery carrier housing 154 has a seal carrier guide face 200 which co-operates with the guide face seal 180 and the external cylindrical surface 176 of the moving seal carrier 160.

The axis of rotation of the second bevel gear 150 is perpendicular to, and in the same rotational plane as, the axis of the internal cylindrical surface 52 in the closure member 50. It is also perpendicular to the main pivotal axis 64. The second bevel gear 150 is located to engage the ring gear 120. Rotation of the hand wheel 74 will cause rotation of the minor inner stem 70 which will turn the first bevel gear 80 driving the ring gear 120 and the second bevel gear 150.

The moving seal carrier 160 may be installed in the stationery carrier housing 154 by slidably engaging the guide face seal 180 in the seal carrier guide face 200 with the clearance hole 192 aligned to admit the locating pin 194. The locating pin 194 will then act as a stop means to prevent the moving seal carrier 160 from spinning within the stationery carrier housing 154. Other means to prevent spinning, such as use of a rectangular or other non-cylindrical moving seal carrier profile, or slidable ways such as used in lathes or milling machines, would be obvious to those skilled in the art.

Rotation of the handwheel 74 and consequent rotation of the second bevel gear 150 will cause the internally threaded collar 152 to engage the jack screw 156. Further rotation of the hand wheel 74 will pull the moving seal carrier 160 inwardly to its retracted position. In its retracted position the seal carrier 160 will be closest to the axis 64 as measured along a radius from that axis 64 to the seal carrier 160. Pivoting motion of the closure member 50 due to motion of the valve opening and closing lever 66 may then occur without contact of the main seal 190 with the internal spherical surface 60 of the housing 12.

The cylindrical bore 18 of the inlet half shell 24 has a cylindrical surface 202 which intersects the internal spherical surface 60 of the geared ball valve housing 12. Adjacent to that intersection and integral to the internal spherical surface 110 is an internal spherical arcuate valve seat 210.

When the valve opening and closing lever 66 is moved to its closed position, the valve body internal cylindrical surface 52 will be perpendicular to the bore 18 and the moving seal carrier 160 will be athwart the main flow axis of the valve with the main seal 190 facing, but not yet engaging, the spherical arcuate valve seat 210. The engagement and disengagement of the jack screw 156 in the internally threaded collar 152 constitutes a jacking means to translate the moving seal carrier 160 radially relative to the axis 64. Guiding means is provided by the seal carrier guide face 200 interacting with the surface 176.

Rotation of the handwheel 74 in a direction opposite to that previously considered will cause extension of the jack screw 156 from the internally threaded collar 152. This extension will ultimately force the main seal 190 against the spherical arcuate valve seat 210, thus sealing the valve and stopping any flow.

Choice of a fine thread or a suitable reduction gear ratio will permit a large closing force to be developed in the main seal 190 by the application of a moderate torque at the handwheel 74. The combination of the handwheel 74, minor stem 70, first bevel gear 80, ring gear 120, second bevel gear 150, stationary carrier housing 154 and moving seal carrier generally 160 thereby provide an auxiliary means movable relative to the major stem to move the main seal 190 relative to the axis 64. The main seal 190 and the spherical arcuate valve seat 210 constitute co-operative sealing means for sealing the inlet 14.

Figure 5:
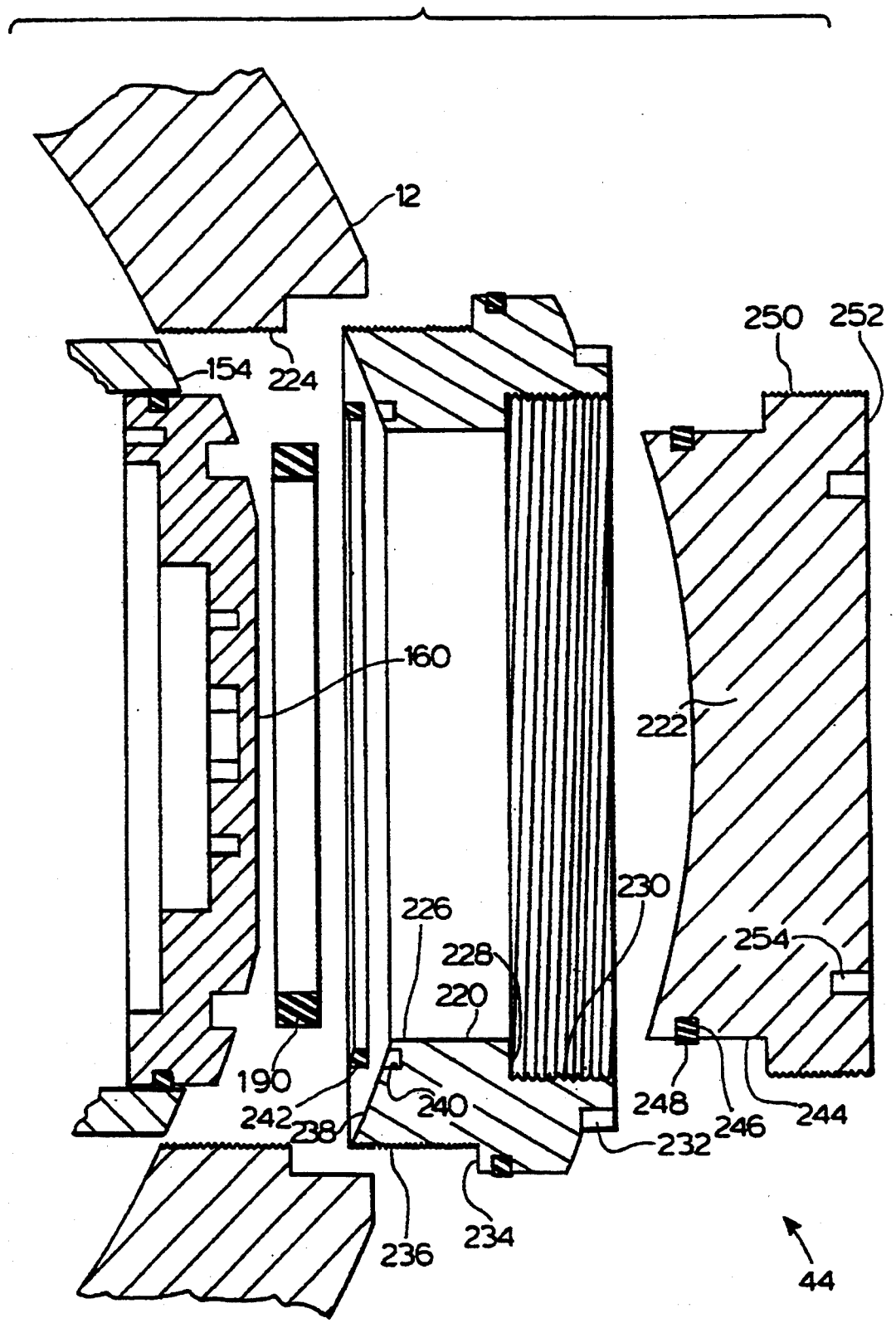
FIG. 5 is a cross-sectional detailed view of the inspection port of the preferred embodiment shown generally in FIG. 1.

FIG. 5 illustrates a cross-section of the inspection port shown generally as 44. The valve opening and closing lever 66 has been moved to its open position placing the moving seal carrier 160 and the stationery carrier housing 154 adjacent to the inspection port 44. The inspection port shown generally as 44 comprises a closure ring 220 and an inspection port cover 222. The housing 12 has an internally threaded cylindrical face 224 of a diameter greater than the external cylindrical surface 166 of the stationery carrier housing 154.

The closure ring 220 has a first inner cylindrical surface 226, a first shoulder 228, a threaded inner cylindrical surface 230, flats 232 adapted to be gripped by wrenches, a second shoulder 234, a threaded external cylindrical surface 236, an internal part spherical surface 238 and an annular channel 240 adapted to carry an O-ring seal 242. The root diameter of the threaded external cylindrical surface 236 is greater than the outside diameter of the stationary carrier housing 154.

The inspection port cover 222 has a first external cylindrical surface 244, an annular channel 246 to accommodate an O-ring seal 248, an externally threaded cylindrical surface 250, an outward surface 252 and key recesses 254.

With both the inspection port cover 222 and the closure ring 220 removed, the stationery carrier housing 154 may be installed, inspected or removed. On installation of the closure ring 220, the threaded external cylindrical surface 236 tightly engages the internal threaded face 224 of the valve housing 12. The inspection port cover 222 is installed by engaging the externally threaded cylindrical surface 250 with the threaded inner cylindrical surface 230 of the closure ring. The inspection port cover 222 is tightened by means of the key recesses 254 shown in the outward surface 252.

Motion of the handwheel 74 to extend the moving seal carrier 160 will cause engagement of the moving seal carrier external part spherical face 182 with the inward facing O-ring seal 242 of the closure ring 220. The diameter of the first inner cylindrical surface 226 of the closure ring 220 is greater than the outer diameter of the main seal 190. Thus, when the moving seal carrier 160 is in its extended position, removal of the inspection port cover 222 will give access to the main seal 190 such that it may be inspected, removed or replaced as desired, even when the valve is under pressure as in normal operation. The seal 190 may therefore be serviced without interrupting the flow.

The ring gear 120 is a convenient, but not necessary feature of this invention. It would be obvious to one skilled in the art that a similar result could be achieved with an appropriately chosen first driving bevel gear and a suitable second driven bevel gear without need for an intermediary ring gear.

Equally, while a system of bevel gears is described, the minor stem could be used to turn a worm gear, either directly or through auxiliary shafting to turn the driven gear and extend the jack shaft. Use of a worm gear would allow an even greater closure force to be developed. Similarly, the location and relative operative relationship of the collar and jack-shaft may be reversed, that is, the second gear could carry the shaft and the seal carrier could carry the collar. Various other arrangements utilizing a jack screw thread may also be substituted. Alternatively, rather than utilizing a collar and jack screw, a ring gear could be provided with a cam surface and the jackscrew would be replaced by a follower for that cam. With this structure movement of the ring gear would move the cam which would move the follower which in turn would move the seal carrier.

In accordance with the structure of this invention there is no need to have anything other than a simple pivotal connection between the housing and the closure member opposite the operating stems.

If desired, an additional or backup sealing face could be added to the closure member located diametrically opposite the seal carrier discussed. Such a second seal could be used as a backup seal.

Although a particular preferred embodiment of the invention has been disclosed in detail for illustrative purposes, it will be recognized that variations or modifications of the disclosed apparatus including the rearrangement of parts lie within the scope of the present invention as defined in the following claims.

I claim:

1. A ball valve for use in a pipeline comprising a housing, having an inlet, an outlet, and an internal chamber to accommodate a closure member, a closure member contained within said chamber, said closure member having a passageway extending therethrough for aligning with said inlet and said outlet for permitting fluid within said pipeline to flow through said passageway, said closure member carrying a movable seal carrier, said closure member being movable from a closed position blocking fluid flow through said valve to an open position permitting fluid flow through said passageway and operating means to move said closure member including main means to move said closure member angularly about an axis and auxiliary means movable relative to said main means to move said seal carrier radially with respect to said axis, said closure member and said housing having co-operative sealing means for sealing said inlet and said means to move said closure member angularly comprising a main stem affixed to said closure member and a pivotal connection between said closure member and said housing, said closure member mounted on said pivotal connection, and said means to move said seal carrier of said closure member radially with respect to said axis comprises an auxiliary stem concentric with said main stem, said closure member including guiding and jacking means, said guiding and said jacking means adapted to guide and translate said seal carrier radially relative to said axis and relative to said closure member and connecting means operatively connecting said auxiliary stem to said jacking means so that rotation of said auxiliary stem causes said translational movement of said seal carrier and said connecting means comprises a plurality of gears, said gears mounted for rotation about mutually perpendicular axis, said gears mounted within said closure member so that fluid flowing through said passageway does not contact said gears.

2. The valve of claim 1 wherein said valve comprises a first gear mounted on said auxiliary stem for rotation therewith.

3. The valve of claim 2 wherein said valve comprises a second gear, said second gear mounted on said closure member for rotation about a second axis, said second gear co-operating with said first gear so that rotation of said first gear causes rotation of said second gear.

4. The valve of claim 3 wherein said valve comprises a ring gear and said ring gear meshes with said first gear and, said ring gear meshes with said second gear.

5. The valve of claim 4 wherein said jacking means comprises a threaded shaft and a threaded collar and said second gear is fixed to one of said collar and said threaded shaft, for rotation therewith.

6. The valve of claim 5 wherein said seal carrier is fixed to the other of said one of said collar and said shaft.

7. The valve of claim 6 wherein said valve comprises stop means to eliminate rotation of said seal carrier relative to said closure member.

8. The valve of claim 4 wherein said passageway comprises a cylindrical surface having a passageway axis and said ring gear is mounted to said closure member for rotation about said passageway axis.

9. The valve of claim 1 wherein said housing comprises an inspection port, said inspection being sufficiently large that said sealing means of said closure member may be replaced through said port.

10. The valve of claim 1 wherein said guide means comprises a first surface on said closure member, and said seal carrier comprises a second surface adapted to be slidable along said first surface.

11. The valve of claim 10 wherein said first surface is cylindrical, said second surface is cylindrical and said first and second surfaces are adapted to fit closely to each other.

* * * * *